Nov. 10, 1970  F. N. SHAFFER  3,539,857

ANTIMONY ACTIVATED YTTRIUM PHOSPHATE PHOSPHOR

Filed May 16, 1968

INVENTOR
FRANCIS N. SHAFFER

United States Patent Office 3,539,857
Patented Nov. 10, 1970

3,539,857
ANTIMONY ACTIVATED YTTRIUM PHOSPHATE PHOSPHOR
Francis N. Shaffer, Towanda, Pa., assignor to Sylvania Electric Products Inc., a corporation of Delaware
Filed May 16, 1968, Ser. No. 729,742
Int. Cl. C09k 1/36; H01j 1/63
U.S. Cl. 313—109          6 Claims

ABSTRACT OF THE DISCLOSURE

Compounds of yttrium phosphate activated by antimony and compounds of terbium activated yttrium phosphate co-activated by antimony are novel and useful phosphors which luminesce when exposed to cathode ray excitation and 2537 A. excitation.

Field of the invention

Figure 1:
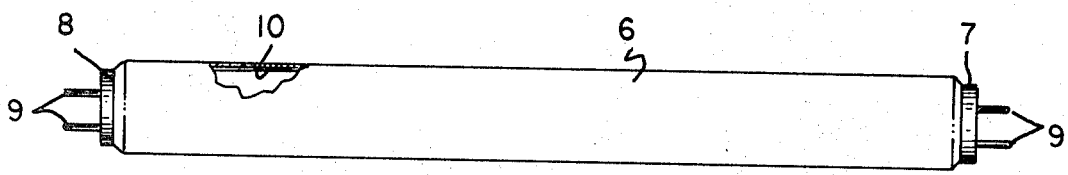

This invention relates to synthetic inorganic phosphors. More precisely, the invention disclosed herein relates to compounds of yttrium phosphate activated by antimony and compounds of terbium activated yttrium phosphate co-activated by antimony which function as phosphors when exposed to a source of activating radiation.

Description of the prior art

Phosphors are known products of commerce. Generally the term is employed in the art to describe luminescent or fluorescent solids which comprise two essential ingredients; a "host" and "matrix" compound and an "activator." Better known host materials include silicates, phosphates, sulfides, selenides, the alkali halides and oxides of calcium, magnesium, barium, zinc as well as other materials which could be mentioned. Activators most frequently employed include among others, copper, silver, thallium, lead, cerium, chromium, titanium and tin. Oftentimes, amounts ranging from only a few parts per million to several precent can confer fluorescent properties on the host compound. Generally, synthetic phosphors are readily prepared by reacting well mixed, finely divided powders of the host and activator at high temperatures.

Synthetic inorganic phosphors are most generally used in fluorescent lighting. However, some find specialized applications in cathode ray tubes used in television and radar for example. It is not deemed necessary to discuss in detail manners and/or methods whereby phosphors are assembled or otherwise integrated with other components or structural elements necessary to accomplish a given function or application in which a phosphor is employed. These manners and/or methods are well known to those skilled in the art to which the present invention pertains. However, it is also well known that development and progress in the synthetic inorganic phosphor art primarily depends upon and awaits the discovery of new synthetic inorganic phosphors. In this fashion, the present range of applications for phosphors can be expanded and new phosphors become available which can oftentimes be substituted for known phosphors to obtain improved performance in existing applications.

Compounds of yttrium phosphate and terbium activated compounds of yttrium phosphate are known phosphors. For example, it is known that such compounds fluoresce under cathode ray excitation but are essentially inert under 2537 A. excitation. Accordingly, any invention whereby the spectral response of compounds of yttrium phosphate or compounds of terbium activated yttrium phosphate can be altered so that they can fluoresce when exposed to 2537 A. excitation as well as to cathode ray excitation would indeed be a notable contribution to the art.

SUMMARY OF THE INVENTION

In accordance with the present invention, compounds of yttrium phosphate activated by antimony or compounds of terbium activated yttrium phosphate co-activated by antimony are presented as novel and useful phosphors. Quite surprisingly, the phosphors of the present invention fluoresce under both cathode ray and 2537 A. excitation whereas compounds of yttrium phosphate or terbium activated yttrium phosphate are essentially inert when exposed to 2537 A. excitation. Also the antimony containing yttrium-terbium phosphate phosphors of the present invention manifest longer decay times than their non-antimony containing counterparts. Accordingly, the novel phosphors of the present invention can be advantageously employed as useful phosphors in fluorescent lights or in radar tubes.

The novel antimony activated yttrium phosphate phosphors and the terbium activated yttrium phosphate co-activated by antimony which are the subject of the present invention conform to the following formula:

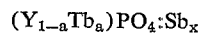

$$(Y_{1-a}Tb_a)PO_4:Sb_x$$

where $a$ represents the mole fraction of terbium present in the phosphor and $x$ represents the mole fraction of antimony. The concentration of terbium in the phosphors of the present invention can vary over a rather wide range. However, the concentrations most generally employed can vary from 0.0 to 0.30 gram atom per mole of phosphate. Accordingly, although higher concentrations of terbium can be included—especially when specialized properties are desired—nevertheless, in the preferred phosphors of the present invention, $a$ is an integer between 0 and 0.3. The concentration of antimony included in compounds of the present invention—as indicated by $x$—can also vary over a wide range. However, the best balance of properties are obtained when the concentration of antimony is between about 0.0005 and 0.3 gram atom of antimony per mole of phosphate. Accordingly, in the preferred phosphors of the present invention, $x$ is an integer between about 0.0005 to 0.3. Thus phosphate anions are substantially stoichiometric with respect to the yttrium or yttrium-terbium cations.

DESCRIPTION OF THE PREFERRED EMBODIMENTS

From the above discussion, it will be apparent that the phosphors included within the scope of the present invention are phosphors of yttrium phosphate activated by antimony and phosphors of terbium activated yttrium phosphate co-activated by antimony. Accordingly, the phosphors of the present invention can be more precisely defined by reference to Formulae A and B below:

FORMULA A

Phosphors of yttrium phosphate activated by antimony

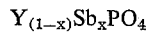

$$Y_{(1-x)}Sb_xPO_4$$

where $x$ can be an integer from about 0.0005 to about 0.3 or somewhat higher if specialized properties are desired.

Phosphors conforming to Formula A can be readily prepared by way of a high temperature reaction of yttrium phosphate and an antimony compound or well mixed mixtures of the nitrates, oxides, acetates, oxalates, tartrates and the like of yttrium with a decomposable compound of antimony, preferably the oxides thereof and with phosphorus containing compounds such as phosphates, phosphites and the like. Usually the respective concentrations of the cation and anion containing compounds are adjusted so that the ratio of gram atoms of cations to gram atoms of anion in the final phosphor is about 1:1. This ratio of cations to anion can be varied somewhat but the best balance of presently desired properties are obtained when the ratio is maintained between about 0.25:1 and 1.25:1.

FORMULA B

Phosphors of terbium activated yttrium phosphate co-activated by antimony $$(Y_{1-a}Tb_a)PO_4:Sb_x$$

where $a$ can be an integer greater than 0 to about 0.3 or somewhat higher and $x$ can be an integer between about 0.0005 to about 0.3.

Phosphors conforming to Formula B can be prepared somewhat in the same fashion as described for Formula A. However, phosphors of Formula B are most conveniently prepared by a two-step process. Normally as the first step, a decomposable phosphate compound containing yttrium and terbium in a concentration corresponding to the desired mole fraction of terbium are coprecipitated from solutions of salts of phosphate yttrium and terbium. Thereafter a phosphor of terbium activated yttrium phosphate co-activated with antimony is produced by the high temperature reaction of a mixture of the compound produced in the above-described step, and a decomposable antimony compound. The ratio of cations to anions in phosphors of Formula B is maintained essentially within the limits discussed above with respect to phosphors of Formula A.

The practice of the present invention and manners of practicing same will be better understood by reference to the following illustrative examples.

EXAMPLE I

A method for preparing a phosphor corresponding to Formula A

Mortar together the following ingredients:

$Y_2O_3$—2.26 g. (g. atom Y, 1.00)
$(NH_4)_2HPO_4$—3.00 g. (g. mol $PO_4$, 1.13)
$Sb_2O_3$—0.15 g. (g. atom Sb, 0.05)

Fire the above mixed ingredients in a silica crucible at 900° C. in air for about ¾ hour. After cooling, mortar the fired mixture to produce a finely divided product.

An antimony activated yttrium phosphate phosphor prepared as above showed a strong blue fluorescence under 2537 A. excitation. In contrast thereto a compound of yttrium phosphate without antimony was inert under such excitation.

Antimony activated yttrium phosphate phosphors containing varying amounts of antimony can be prepared essentially in accordance with the above procedure. For example, instead of producing a phosphor containing 0.05 gram atom antimony as above, phosphors containing 0.1 and 0.3 gram atom of antimony were also prepared. However, as the concentration of antimony is increased the ultimate phosphor exhibits somewhat decreased blue fluorescence.

EXAMPLE II

A method for preparing a phosphor corresponding to Formula B

Prepare a solution of $(YTb)(NO_3)_3$ as follows: Dissolve 102 grams yttrium oxide and 18 grams terbium oxide (about 0.1 gram atom terbium as mixed terbium oxide) in 450 ml. hot deionized water by the slow addition of about 200 ml. nitric acid while stirring and heating. Adjust the pH of the solution to 4.5 by the very slow addition of dilute $NH_4OH$ and then dilute the solution with deionized water to 500 ml. and heat to about 60° C.

Prepare a $(NH_4)_2HPO_4$ solution as follows: Dissolve 152 grams $(NH_4)_2HPO_4$ in 242 ml. hot deionized water and adjust the pH to 4.5 by slowly adding nitric acid. Dilute the solution to 500 ml. with deionized water and heat to about 60° C.

Prepare $(YTb)PO_4 \cdot 2H_2O$ by mixing solutions of the above prepared $(YTb)(NO_3)_3$ and $(NH_4)_2HPO_4$ as follows:

Slowly add the 1.15 gram mole of $(NH_4)_2HPO_4$ as a hot solution at a pH of 4.5 to the 1 gram mole of $(YTb)(NO_3)_3$ as a hot solution at a pH of 4.5 while maintaining agitation in the latter. The 15 percent excess $(NH_4)_2HPO_4$ provides ample phosphate to insure maximum yield and at the pH range 4.4 to 4.6 the ratio of Y+Tb to $PO_4$ in the resultant precipitate is 1:1. Dilute the resultant precipitate slurry to 4 liters with hot water. Agitate the slurry for about ½ hour and then allow the slurry to stand for about 16 hours. After standing, agitate the slurry and adjust the pH to 4.5 with $NH_4OH$. Allow the material to settle to about ½ volume and decant off about 6 liters of supernatant liquid. Wash the slurry about 6 times; each time by diluting to 12 liters with hot $H_2O$, stirring, allowing the slurry to settle to about ½ volume and decanting off about 6 liters of supernatant liquid. Then filter the slurry and dry in an oven for about 40 hours. The above procedure produces about 216 grams of yttrium-terbium phosphate as a white powder having an ignition loss at 1200° C. of about 15%.

The above prepared yttrium phosphate has about the following composition:

| | |
|---|---|
| Yttrium | g. atom 0.9 |
| Terbium | g. atom 0.1 |
| Phosphate ($PO_4$) | g. mol 1.0 |
| Combined water ($H_2O$) | g. mol 2.0 |

The terbium activated yttrium phosphate as described above was employed to produce a series of four phosphors of terbium activated yttrium phosphate co-activated with antimony. The concentration of antimony in each of the four phosphors varied from 0.0033 g. atom antimony per g. mole of phosphate to 0.01 to 0.033 to 0.10 respectively. Each of the phosphors was produced by mortaring together 4.5 g. of the above described $(YTb)PO_4 \cdot 2H_2O$ with the appropriate amount of $Sb_2O_3$ to provide the g. atom of Sb desired. For example, 0.01 gram of $Sb_2O_3$ was employed to produce the terbium activated yttrium phosphate co-activated with 0.0033 g. atom of antimony. After mortaring, the ingredients were fired at 1100° C. for 60 hours. After firing, the phosphor was mortared to produce a finely divided product.

The phosphors of terbium activated yttrium phosphate co-activated by antimony produced as described above all strongly fluoresced yellow green under 2537 A. excitation whereas a terbium activated yttrium phosphate was essentially inert under 2537 A. excitation. Moreover, the brightness of the 2537 A. photoluminescence for the above described phosphors of terbium activated yttrium phosphate co-activated with antimony increased progressively as the concentration of antimony was varied from 0.0033 to 0.033 gram atom antimony per gram mole of phosphor. However, with the terbium activated yttrium phosphate activated with 0.1 gram atom antimony per gram mole of phosphor, the brightness was somewhat decreased. Accordingly, the preferred concentration of antimony in phosphors prepared as described above is between 0.0033 g. atom per g. mole of phosphor to about 0.1 g. atom.

Since the phosphors of the present invention fluoresce when exposed to 2537 A. excitation, they can be advantageously employed in fluorescent lamps. Their utility in such an application will be better understood by reference to the accompanying drawing.

Referring now to FIG. 1 of the drawing, a typical fluorescent lamp containing mercury vapor is shown including a glass envelope 6 having end caps 7 and 8 with electrical lead in wires 9. A layer 10 of a phosphor of the present invention is coated on the internal surface of the glass envelope 6.

Figure 2:
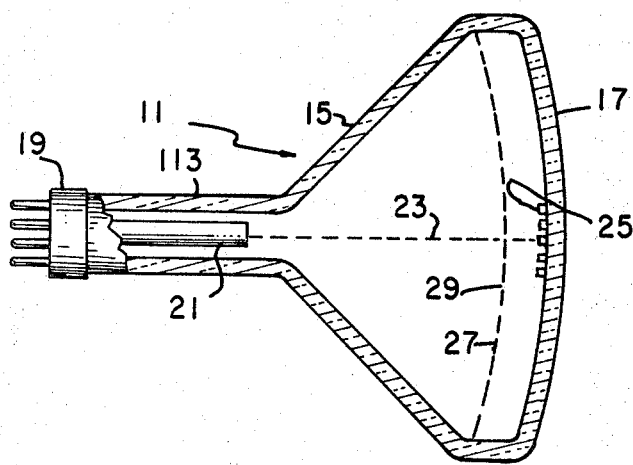

The phosphor of our invention can be disposed upon the screen of a cathode ray tube such as shown in FIG. 2 and commonly in use in television receiving apparatus.

The tube comprises an envelope 11 having a neck portion 13, a funnel portion 15, and a face panel 17. A tube base 19 is attached to the neck portion 13 to provide means for connecting the tube electrodes with their associated receiver circuitry. Within the neck 13 there is mounted an electron gun or guns 21 which provide the electron beam or beams 23 utilized in the operation of the tube. A color screen 25 having the usual configurations of color-emitting phosphors is formed on the internal surface of face panel 17. Positioned adjacent to screen 25, but substantially spaced therefrom, is a mask or grid 27 having therein a plurality of apertures 29. The type of tube illustrated in FIG. 2 may use grid 27 primarily to either focus or deflect beam 23, or to mask, or to mask and focus the electron beam to attain proper electron impingement upon the color screen 25. The specific grid and screen structures and the potentials on the grid and screen will determine the type of operation in a manner well understood in the art.

Many modifications of the incidental details set forth in the above examples for the purpose of illustrating the invention can be employed without departing from the spirit and scope of the invention as defined in the appended claims.

Having described the invention together with preferred embodiments thereof as well as manners of practicing the same that is declared as new and desired to be secured by U.S. Letters Patent is as follows.

As my invention, I claim:

1. A phosphor corresponding to the following formula:

$$(Y_{1-a}Tb_a)PO_4{:}Sb_x$$

where $a$ represents the number of gram atoms of terbium in the phosphor, per mole of phosphate and is an integer between 0 and about 0.3 and $x$ represents the number of gram atoms of antimony in the phosphor per mole of phosphate and is an integer between about 0.0005 and about 0.3.

2. A phosphor of claim 1 wherein $a$ is 0 and $x$ is an integer between about 0.0005 and 0.3.

3. A phosphor of claim 1 wherein $a$ is an integer greater than 0 to about 0.3 and $x$ is an integer between about 0.0005 and 0.3.

4. A low pressure electric discharge device comprising: a glass envelope containing mercury vapor, means to produce an electrical discharge within said device; and disposed on the inner surface of said envelope, a phosphor corresponding to the following formula:

$$(Y_{1-a}Tb_a)PO_4{:}Sb_x$$

where $a$ represents the number of gram atoms of terbium per mole of phosphate in the phosphor and is an integer between 0 and about 0.3 and, $x$ represents the number of gram atoms of antimony per mole of phosphate in the phosphor and is an integer between about 0.0005 and about 0.3.

5. The device of claim 4 wherein $a$ is 0 and $x$ is an integer between about 0.0005 and about 0.3.

6. The device of claim 5 wherein $a$ is an integer greater than 0 to about 0.03 and $x$ is an integer between about 0.0005 and about 0.3.

References Cited

UNITED STATES PATENTS 3,481,884   12/1969   Palilla et al.

TOBIAS E. LEVOW, Primary Examiner

R. D. EDMONDS, Assistant Examiner

U.S. Cl. X.R.

252—301.4; 313—92, 227